United States Patent [19]

Bode

[11] Patent Number: 5,797,186
[45] Date of Patent: Aug. 25, 1998

[54] METHOD FOR MANUFACTURABILITY OF A LOW COST PRINTING DRUM

[75] Inventor: John Hans Bode, Eden Prairie, Minn.

[73] Assignee: Colorspan Corporation, Eden Prairie, Minn.

[21] Appl. No.: 709,804

[22] Filed: Sep. 10, 1996

[51] Int. Cl.⁶ .................................................. B21K 1/02
[52] U.S. Cl. ................. 29/895.22; 29/895.2; 29/895.3; 492/22; 492/47
[58] Field of Search ................... 29/895.2, 895.22, 29/895.3; 492/18, 47, 59, 56, 22; 264/230, 235, 345, 346; 355/159

[56] References Cited

U.S. PATENT DOCUMENTS

| | | | |
|---|---|---|---|
| 2,317,409 | 4/1943 | Seaton | 264/346 |
| 3,106,767 | 10/1963 | Fox | 264/346 |
| 3,795,033 | 3/1974 | Donnelly et al. | 492/56 |
| 5,206,992 | 5/1993 | Carlson et al. | 492/56 |

*Primary Examiner*—Irene Cuda
*Assistant Examiner*—V. Nishanian
*Attorney, Agent, or Firm*—Paul H. McDowall

[57] ABSTRACT

A method for manufacturing an imaging drum for use in applying ink to the imaging drum as the drum rotates. The present method possesses utility in that previously unsuitable low cost materials for use in creating an imaging drum characterized by rigorous specification and tolerance requirements adequately perform when manufactured in accordance with the present method. The present method finds use in the digital printing and imaging industry where successful repeatable and accurate printing requires precise knowledge of the characteristics of the print engine mechanical motion and printing materials which include printing media (e.g., paper, vinyl, film, wax or other thermally imaged substrates that typically include emulsion coatings thereon) to promote consistent interaction with printing media marking materials such as ink, toner, or various printing ribbon resin-based compounds, etc. In order to create high resolution, photorealistic output from such digital print engines, the precise location of each dot or picture element (i.e., pixel) must be predictable and therefore, in a drum-based imaging print engine, the drum should possess ideal physical characteristics.

8 Claims, 4 Drawing Sheets

RIGID OR COLLAPSIBLE MANDREL

METHOD FOR MANUFACTURABILITY OF A LOW COST PRINTING DRUM

FIELD OF THE INVENTION

This invention relates to printing generally, and in particular to a method and apparatus for manufacturing an imaging drum for use in applying ink to the imaging drum as the drum spins. The present invention possesses utility in that previously unsuitable low cost materials, for use in creating an imaging drum characterized by rigorous specification and tolerance requirements, adequately perform when manufactured in accordance with the present invention.

The present invention finds use in the digital printing and imaging industry where successful repeatable printing requires precise knowledge of the characteristics of the print engine mechanical motion and printing materials which include printing media (e.g., paper, vinyl, film, wax or other thermally imaged substrates that typically include emulsion coatings thereon) to promote consistent interaction with printing media marking materials such as ink, toner, fields of increased temperature, or various printing ribbon resin-based compounds, etc. In order to create high resolution, photorealistic output from such digital print engines, the precise location of each dot or picture element (i.e., pixel) must be predictable and therefore, in a drum-based imaging print engine, the drum should possess ideal repeatable and accurate physical characteristics.

BACKGROUND OF THE INVENTION

The present invention relates to a method of forming a light weight, low cost drum upon which a printing substrate or media resides during a printing process. The drum rotates on its longitudinal axis and one or more print heads typically driving at least one ink nozzle or material for heating the media, causes marks to appear on the printing medium disposed on a surface of the spinning drum.

By way of background to the specific industry of application for the present invention, prior art digital printing systems typically operate either by incrementally moving or "stepping" a print medium transverse to a stationary or reciprocating imaging print head or by rotating an imaging drum around its axis while a print head reciprocates across an imaging surface of the imaging drum. The present invention relates to the latter drum-based approach. In both embodiments the print head frequently includes a plurality of discrete imaging elements suitably arranged in a pattern, one or more linear arrays disposed proximate the printing substrate, or as a single marking point element. A net result is that discrete dots are placed on precise locations on the printing media so that a accurately produced visual image is rendered upon the printing media. Each pixel generally refers to a coverage area defined by this stepping resolution in the "vertical" or y-direction relative to a print head fixed in the x-direction, and the number of discrete marks producible by the thermal print head in the "horizontal" or x-direction. These pixels must be controlled very carefully to impart desired quality of the image, and the mechanical characteristics of the print engine, the physical and chemical interaction between the marking material and the printing media as well as the environmental conditions under which the marking material is deposited upon the printing media all contribute to the quality of the actual image rendered.

In the prior art, a media carrying imaging drum must meet or surpass stringent specification and quality testing scrutiny relative to any deviation in the physical dimensions of the drum, such that any difference in the value of actual dimensions from the specified or predicted dimensions will cause printing error. Thus, heretofore expensive, time consuming milling, casting, or other process was required to create the desired stable dimensional profile for the imaging drum.

Most digital print engines that typically use one or more of a subset of the four subtractive primary colors: cyan, magenta, yellow, and black ("CMYK") and rely upon "color blending" of these four ink colors to achieve accurate representations of desired color(s). This color blending phenomena exists when a human viewer perceives an image printed as either dot-on-dot or dot-next-to-dot by the printer engine, both known printing modes. Thus, upon combining ink colors at a given pixel that a particular color combination can be formed by having multiple ink colors at a particular pixel location, thus it can be appreciated that even slight variance in the actual characteristics of the ink (color, viscosity, percent solids, etc.) as well as the characteristics of the printing media upon which the ink rests can affect the overall visual impression created by the printed image.

Thus, a need exists for a method and apparatus for creating a low weight, low cost imaging drum of readily available materials that can be fabricated to virtually any size while satisfying the same exacting dimension and tolerances or the prior art. Thus, consistent high quality prints can be generated by focusing on the most direct printing inputs (e.g., ink and media) while at the same time utilizing a drum member of exacting tolerance albeit from inexpensive and typically unsuitable materials used in fabrication of the imaging drum. Furthermore, the imaging drum must not contain a hysteresis or inherent residual stresses that over time could negatively impact the dimensional rigidity of the imaging drum. While software and other forms of compensating for and accommodating certain dimensional inconsistency of an imaging drum to increase the quality, repeatability, and consistency in a digital print engine controlled to image both large format and high resolution photorealistic images, ensuring dimensional accuracy presents the best manner of eliminating repeating printing errors.

SUMMARY OF THE INVENTION

The reader is encouraged to cross reference and review the present document with a number of U.S. patent applications, filed on even date and commonly assigned to LaserMaster Corporation of Eden Prairie, Minn., USA—the contents of each such application are hereby incorporated by reference in their entirety herein, these application U.S. Ser. No. 08/771,992; 08/771,796; and 08/771,815 and are titled "Calibration and Registration Compensation Method for Manufacturing a Drum-based Print Engine," "Cooperating Mechanical Sub-assemblies for a Drum-based Wide Format Digital Color Print Engine," and "Method of Selecting an Ink Set of an Ink Jet Printer," respectively. Furthermore, applicant herein incorporates U.S. Pat. No. 5,369,429 titled "Continuous Ink Refill System for Disposable Ink Jet Cartridges Having a Predetermined Ink Capacity" and U.S. Pat. No. 5,469,201 directed to a guideway for a continuous ink refill system, both of which are commonly assigned to the present assignee, LaserMaster Corporation.

The technique of the present invention may be performed via conventional thermal processing techniques to effectively anneal the imaging drum to appropriately mark a printing media removeably adhered thereto. Furthermore, the present method quickly, inexpensively, and adequately compensates for the variable physical characteristics of an imaging drum during manufacture and assembly.

DETAILED DESCRIPTION OF THE PREFERRED EMBODIMENTS

A method and apparatus for practicing the method are enabled and taught herein that utilizes previously unsuitable low cost material for the fabrication of one of the most important elements of a drum-based digital imaging print engine. The approach of the present invention is based on use of appropriate thermoplastic compound traditionally used for industrial piping or ducting applications to convey viscous fluids or for ventilation (HVAC). The initial starting material is in fact a length of such material already fabricated for its intended usage.

Figure 1A:
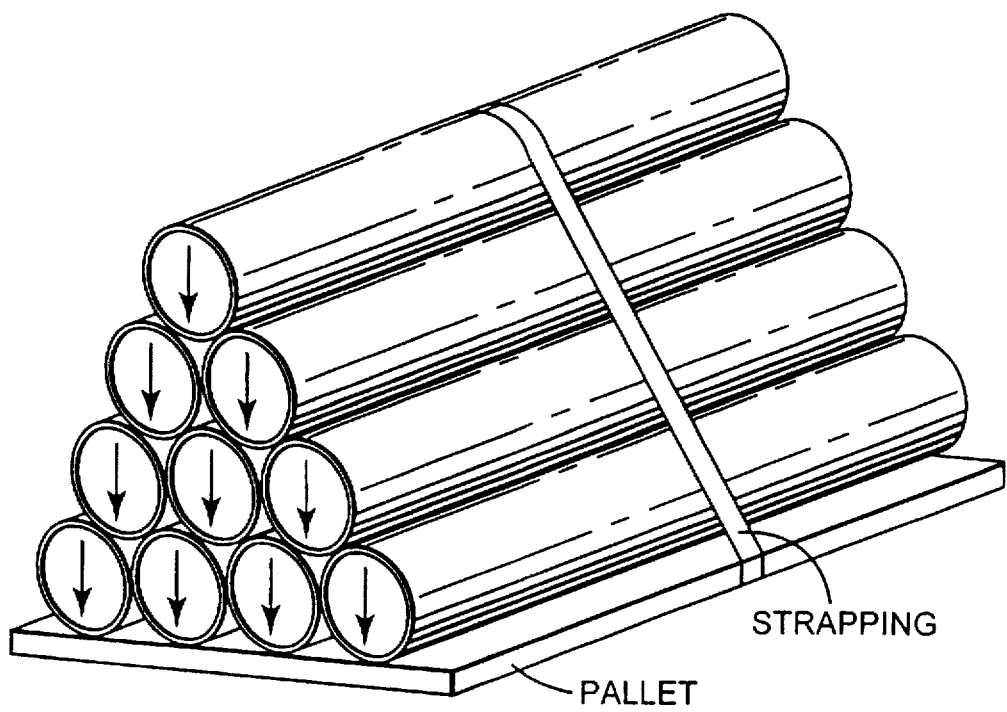
FIGS. 1A and 1B a perspective view of a plurality of raw source material for the drum member of the present invention, as typically handled and stacked upon and strapped to a pallet.
Figure 1B:
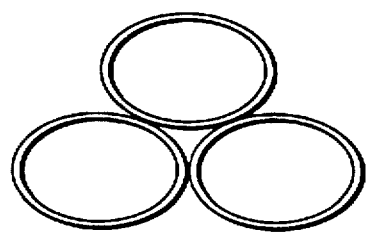

Referring to FIG. 1, a discrete section, of such piping already cut into a length appropriately sized for installation into a print engine of selected size for printing on a substrate having a maximum width dimension. As can be seen in FIG. 1, this initial drum member has a hollow interior with thermoplastic material disposed more or less evenly around the diameter of the initial drum member. It is a fact that for the usual and intended purpose the piping or ducting material is often not engineered, fabricated, stored, nor handled with precision. Thus, it is common for such material to be stacked one on top of the other and subjected to the weight of the pipes on top as well as widely varying atmospheric conditions. The net result manifests itself as severely out-of-round portions of such piping or ducting material, which may include areas characterized as "sagging" or otherwise disfigured from the original cylindrical design. As one of skill in the art appreciates, this material is not the typical highly precise, environmentally stable production material typically used for what is arguably required to be the most fundamentally precise piece of print imaging equipment for a drum-based print engine. As can be appreciated by the reader, appropriate handling such as precise thermal condition, machining, balancing, and implementation can render this typically unsuitable material into a very low cost, and highly precise, drum member.

Figure 2:
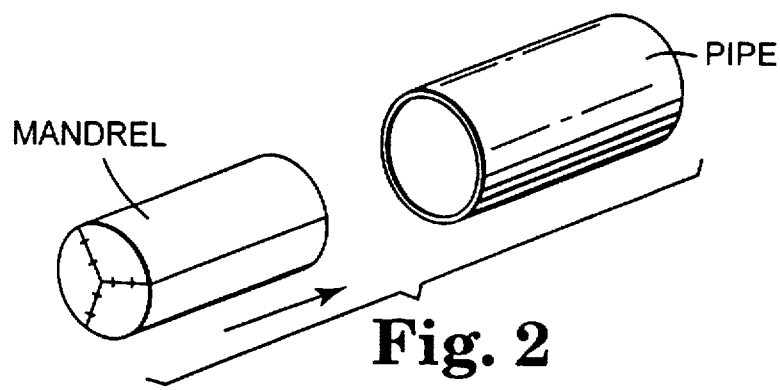
FIG. 2 is a perspective view depicting an embodiment of a mandrel member (and an initial drum section) just prior to being inserted into a length of drum material prior to thermal conditioning in accord with the present invention.

Depicted in FIG. 2, a mandrel sized to firmly, but releaseably mechanically engage the interior circumference of the initial drum member is urged into place so that the mandrel engages the interior of the drum on virtually every portion of the interior surface of the initial drum member. Application of a suitable mold release agent, such as a lubricant, liquid, wax, compressed fluid or air, or powder, or as often used, silicone oil or other branded lubricant containing silicone helps promote removal of the mandrel following the thermal processing steps more fully described below. It should be noted that after release of the mandrel member from the interior of the initial drum member, a set of end caps in conjunction with or without internal support discs must be promptly inserted into the initial drum member so that later occurring or transient thermal conditions do not inadvertently "re-condition" the initial drum member into another likely undesired out-of-round shape.

In the thermal processing steps just referred to, the initial drum member is located within an environmentally controlled container (not shown), such as an oven of appropriate size, or an autoclave where temperature (and pressure) may be incrementally and precisely adjusted over a preselected period of time. While the exact combination of temperature and time may vary during which the thermal conditioning must occur due to composition, diameter, and length of the initial drum member piece, or pieces, undergoing such thermal conditioning, the inventor has discovered a generic recipe wherein the initial drum member is subjected to approximately 170 to 190 degrees Fahrenheit in a sealed container for a period of approximately forty (40) minutes. Thereafter the initial drum member is allowed to passively cool, or may be subjected to forced air at ambient temperatures, or may be actively cooled. The cooling step may be accomplished by an appropriately sized electrical cooling device or other convenient application of suitable cooled fluid (e.g., air, oxygen, water, etc.) provided that the cooling effect is very gradual so that the drum is not subject to a thermal shock from too rapid cooling. A requirement of this cooling step is simply that the initial drum member reach ambient temperatures prior to additional processing, as more fully described herein. After the completion of the thermal condition steps, the initial drum member shall be known as the "drum member."

An artifact of the thermal conditioning of the drum member can be viewed with the naked eye at close range to the drum member as a "pitting," or slight surface imperfections or deformations, of a portion or portions of the surface of the drum member. This is simply an artifact of the thermal conditioning and the inventor believes that such pitting causes no harm or deleterious effects to the drum member. In fact, as will be appreciated as the processing steps for the drum member are revealed, these surface portions are stripped away in subsequent processing steps, and thus, present no obstacle to use of even fairly severely pitted drum members in final product, a drum-based print engine. The thermal conditioning of the drum member imparts a "memory" molecular bond to the thermoplastic material so that even if heated to near the conditioning temperature of approximately 170 degrees Fahrenheit, or beyond the drum member retains its preferred cylindrical shape as long as it is not subjected to loads that would tend to impart an out-of-round shape, or geometry, to the drum member.

Figure 3A:
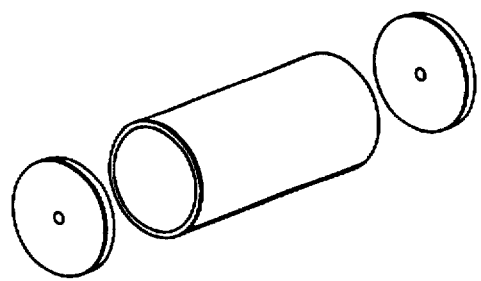
FIG. 3A is a perspective view, partially exploded, of a drum member and two end caps disposed at each end of the drum member, prior to assembly.
Figure 3B:
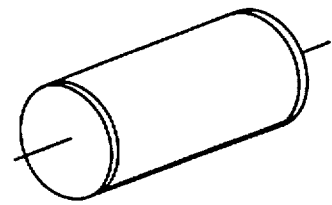
FIG. 3B is a perspective view of a drum member and two end caps fully assembly on a shaft and sealingly coupled to each end of the drum member.
Figure 3C:
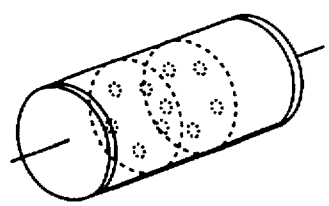
FIG. 3C is a perspective view of a drum member, internal supporting discs, and two end caps fully assembled on a shaft fully sealing and coupling the structure together.

In FIG. 3A, the end caps referred to above are shown just prior to be sealingly coupled to the interior of each end of the drum member, and in FIG. 3B the same end caps are shown in place at each end of the drum member. The end caps assist the drum member in retaining its desired shape for the life of the drum member, although each drum member must be precisely machined or etched into an ideal cylindrical shape due to the very high tolerances required for a drum member in a drum-based print engine. Likewise FIG. 3C shows the drum with internal supports that promote structural stability in drum members fabricated of greater axial dimensions. That is, because of the fundamental role the end caps play in preserving the preferred shape of the drum member for the life of the drum member. Depending on the length of the drum member, one or more intermediate ribs or discs may be installed into the interior of the drum member to further assist in retaining the preferred shape of the drum member. Regardless, as mentioned above the end caps must be sealingly coupled to the drum member so that contamination, including debris generated during manufacture of the drum member and moisture and other undesired material, cannot enter the interior of the drum and thereby affect its balance, as more fully described below. Likewise the drum is driven through the end plate and cannot tolerate a non-uniform and non-continuous bond and therefore a resilient seal must be formed where the shaft and the end plate intersect.

Figure 4:
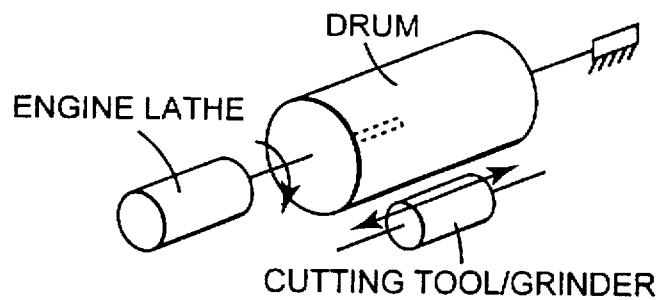
FIG. 4 is a perspective view of a drum member mounted on a lathe-type milling device for removal of a portion of the exterior of the drum member by either cutting or grinding.
Figure 5:
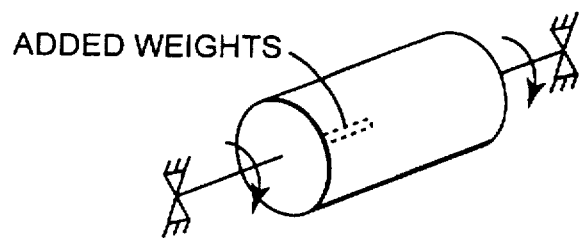
FIG. 5 is a perspective view of a drum being statically or dynamically balanced.

Referring to FIG. 4, a drum member is depicted mechanically coupled to a lathe or other mechanically rotating device while simultaneously suitable milling instruments are iteratively applied to the surface thereof. As the processing continues the amount of material removed decreases until final finishing steps result in a nearly ideally round drum member. As is known in the art other manner of reducing the exterior anomalies exist, such as grinding, chemical etching, sanding, and over-coating with a material having desired physical characteristics. For the latter approach, either a slight electrical bias (static) can be used to direct atomized droplets of such material to evenly coat a slowly rotating drum member so that very even distribution of material covers the entire surface of the drum member. A need for a dynamically balanced drum member becomes very apparent when the drum is rotated during finishing steps. A properly balanced drum member will eliminate chatter during fabrication and improve print quality during printing operations.

Figure 6:
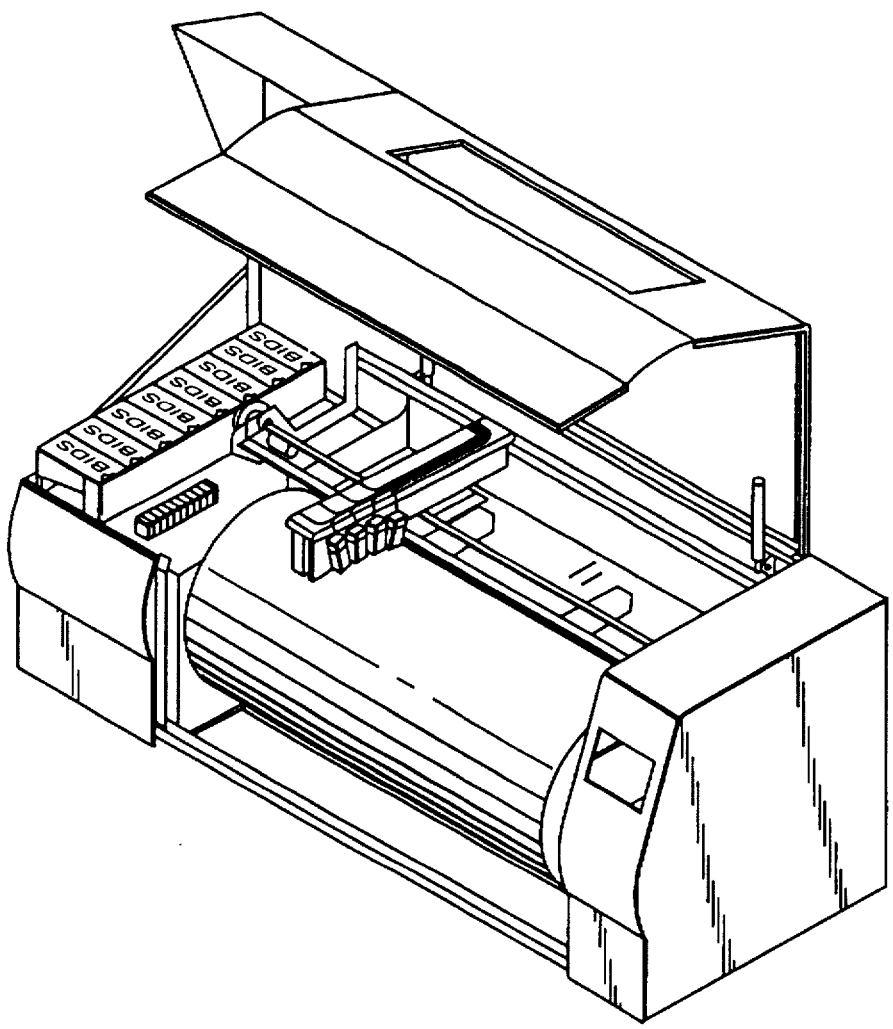
FIG. 6 is a perspective view of the finished drum member mounted into a drum-based digital imaging print engine.

As can be seen in FIG. 6, the finished drum member appropriately mounts into a drum-based print engine so that it rotates around its axis as one or more print heads propel ink or other marking material onto a printing substrate releaseably retained upon the surface of the drum member. To the extent that even greater precision dimension of the drum is required, the inventor is aware of an inventive process for characterizing the exterior of the drum, and storing the characterization information into one or more look up tables that can be retrieved during each print operation so extreme accuracy can be attained. This process has been invented by employees of same assignee as the present application and is merely a software refinement and does not replace the utility or necessity of the presently disclosed invention for a low cost drum member for drum-based print engines.

Inserting a cylindrical mandrel, whether or not collapsible, into the section of piping or ducting the mandrel outside diameter must be the desired interior diameter of the finished printing drum. The printing drum/mandrel assembly is thermally conditioned in a heat chamber, or oven, or autoclave device to approximately 170 to 190 degrees Fahrenheit and maintained kept at that temperature for approximately thirty to forty minutes. During this time the inside and outside (formerly out-of-round) diameter of the printing drum will conform to the cylindrical (round) shape of the mandrel. Some shortening of the drum length will typically occur and must be accounted for in the initial choice of dimensions of the piping or ducting material. Furthermore, a surface feature best described as similar to the texture of the exterior surface of an egg shell can be expected over all or a portion of the surface of the drum. It has been demonstrated that the residual compressive hoop stresses typically created during original manufacture of the piping or ducting material will be transformed into residual tensile hoop stresses as a result of the thermal conditioning of the present invention. This stress reversal is both expected and desired in that during thermal conditioning the material shrinks and tensile hoop stresses are more suitable for holding more true to an ideal round shape. Contrasted to compressive hoop stresses which tend to amplify any localized buckling which will encourage structural instability leading to an increasing out-of-round state of the drum member.

While certain embodiments have been described herein with reference to certain drawings submitted herewith, one of skill in the art will appreciate that other embodiments of the present invention are embodied in the present application and they too benefit from spirit of this invention, as more particularly claimed in the appended claims.

What is claimed is:

1. A method of thermally treating an imaging drum made of a resin-based material, comprising the steps of:

forming a resin-based material into a cylindrical shaped member having a known interior and exterior diameter and both of a first and a second end open;

inserting a mandrel member having a desired dimensional shape into the cylindrical shaped member;

placing the drum member in an autoclave device;

elevating the temperature of the autoclave device so that the drum member reaches a temperature at which the resin material begins to soften;

gradually lowering the temperature of the autoclave device so that the drum member reaches room temperature;

attaching a first of two round end-caps to the first of the open ends of the drum member, wherein the first end cap has an aperture formed in the center therein;

inserting and thereby sealing a drive shaft member coupled to a set of bearings through the aperture in the first end cap so that the drive shaft is rigidly fixed to the drum member and the drum member and drive shaft rotate together on the bearings; and attaching a second of the two round end-caps to the second of the open ends of the drum member so that the drive shaft member protrudes through an aperture formed in the center of the second round end cap.

2. The method of claim 1, further comprising the step of rotating the drum while the drum is diposed inside the autoclave device.

3. The method of claim 1, further comprising a finishing step including the steps of:

rotating the drum member about its axis on an rotating lathe device;

mechanically eliminating an exterior surface layer from the drum member until the drum member reaches a predetermined finished diameter.

4. A method of manufacturing a light weight, low cost ink jet printing imaging drum made of a resin-based material for releasably retaining a printing substrate thereon, comprising the steps of:

coating a mandrel member with a mold release agent;

inserting the mandrel member into a cylindrically shaped tube member made of thermoplastic material wherein the thermoplastic material has a known interior and exterior diameter and openings at both of a first and a second end;

placing the tube member with the mandrel member inserted therein into an oven until they reach a temperature of approximately 170 degrees Fahrenheit which is sustained for approximately 40 minutes;

cooling the tube member with the mandrel inserted therein until they reach ambient temperature conditions;

removing the mandrel member from the tube member;

attaching a first of two round end-caps to the first of the open ends of the tube member, wherein the first end cap has an aperture formed in the center therein;

inserting a drive shaft member through the aperture in the first end cap;

attaching a second of the two round end-caps to the second of the open ends of the tube member so that the drive shaft member protrudes through an aperture formed in the center of the second round end cap, to form an initial imaging drum element therefrom;

rotating the initial imaging drum element; and, removing at least a portion of an outermost surface of the initial imaging drum element until a preselected wall thickness, diameter, and other preselected tolerances and run-out for the initial imaging drum is attained.

5. The method of claim 3, wherein the drum member has an increased dimension of wall thickness, thereby eliminating chatter and material vibration when the drum is rotated during finishing of the drum and during printing operations.

6. The method of claim 4, further comprising the step of:

inserting at least one internal stiffener member intermediate from the end caps.

7. The method of claim 6, wherein prior to inserting the at least one internal stiffener member, the step of:

drilling holes in the internal stiffener members at preselected locations so that the weight of the internal stiffener member is reduced but structural integrity of the drum member is not decreased, and also wherein the preselected locations are chosen to minimize the rotational polar moment of inertia of the drum member.

8. A method of manufacturing a light weight, low cost ink jet imaging drum for releaseably carrying a media substrate during a printing operation, comprising the steps of:

cutting a length of thermoplastic piping or ducting material into at least two or more segments so that the piping material has two open ends and a body portion of uniform length;

coating a round mandrel member with a mold release agent, wherein the mandrel is of a preselected dimension to fill the interior space of the piping material and urge the piping material into a desired uniform round shape;

inserting the mandrel member into one segment of piping material;

heating the piping material with the mandrel member inserted therein until the piping material softens and conforms to the mandrel member;

cooling the piping material and the mandrel member;

removing the mandrel member from the piping member;

attaching two end cap members, each with an aperture for receiving a drive member, to the open ends of the piping material;

mechanically coupling the drive member to the two end cap members;

mechanically removing a portion of an outer layer of the piping material until a uniform smooth outer surface of preselected dimension and tolerance for bearing a printing media is achieved.

* * * * *